Jan. 6, 1948. G. F. FRENCH Re. 22,959
LADDER WEBBING
Original Filed June 26, 1939
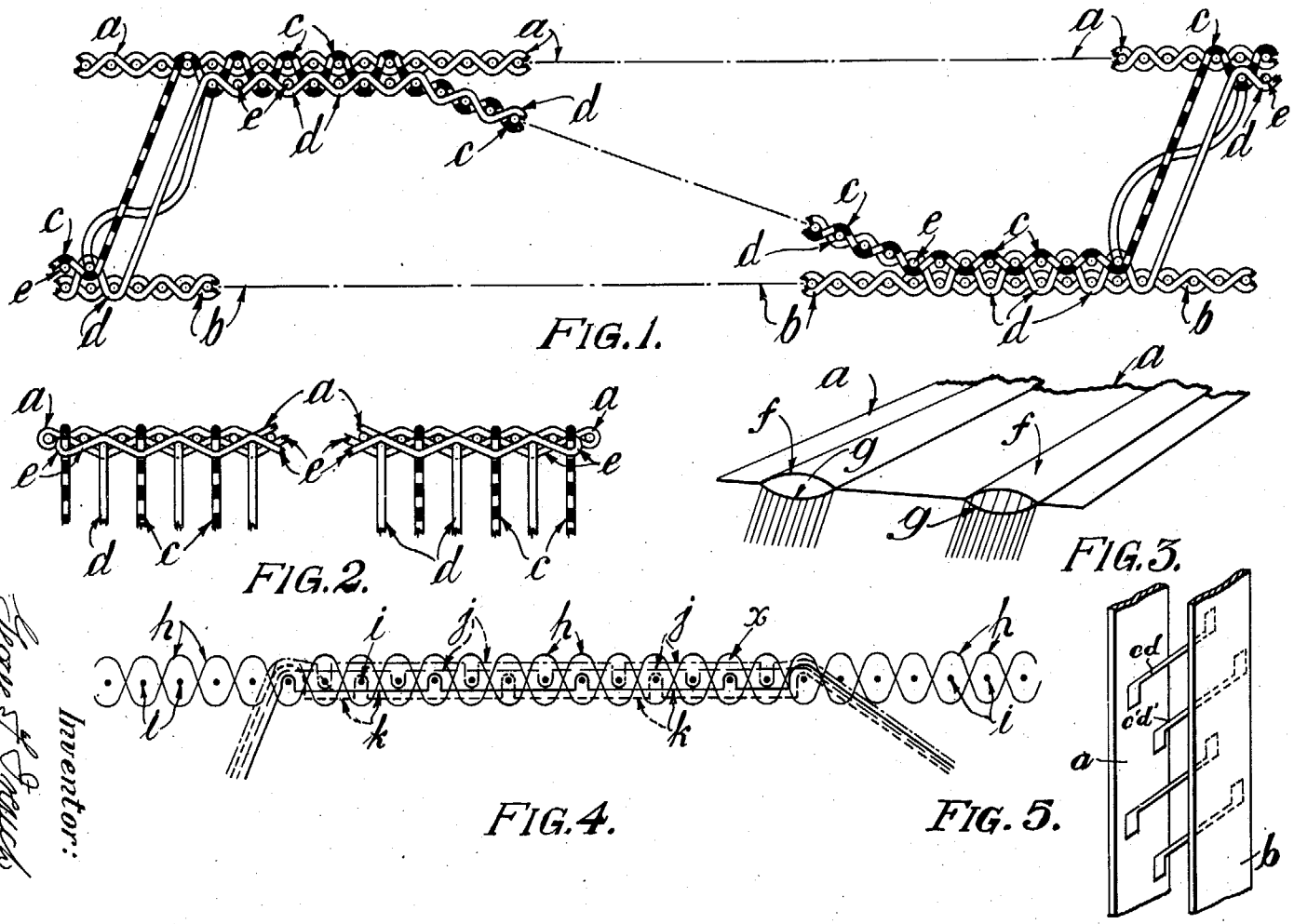
Inventor:
George F. French
Walter Gunn
By his Attorney:

Reissued Jan. 6, 1948

Re. 22,959

UNITED STATES PATENT OFFICE 22,959

LADDER WEBBING

George Frederick French, Manchester, England, assignor to Roger French, Manchester, England, and himself Original No. 2,408,839, dated October 8, 1946, Serial No. 281,228, June 26, 1939. Application for reissue October 6, 1947, Serial No. 778,058. In Great Britain April 6, 1939

15 Claims. (Cl. 139—384)

This invention relates to ladder webbing and its manufacture, which webbing consists of two outer webs or bands (hereinafter referred to as bandings) having between them one or more rows of cross-straps, the ends of the cross-straps being connected to the respective bandings, by weaving. Sometimes the cross-straps are woven and sometimes not.

It is sometimes required, as for instance in Venetian blind webbing, that ladder webbing shall have the outer bandings of different colours, that is to say, having one banding of one colour, say A, and the other banding of another colour, say B. Hitherto, in fulfilling such requirement, it has been usual to make the cross-straps of one only of the two colours (either A or B), but in doing so it has been found that where the ends of the cross-straps have been interwoven with the banding of the different colour, for instance, where the strap threads of the colour A are woven to a banding of colour B, specks or spots appear, usually irregularly, in the outer surface of such banding, due to the presence, in that surface, of parts of the cross-strap warp threads of another colour. A similar defect would occur, to a less extent, wherein a webbing woven in known manner, a banding is itself of two colours (as for instance in a striped banding) and where the strap warps as they intermingle with the banding warps, at the binding-in, are of different colour to the adjacent banding warps.

Again, were a webbing to be woven in known manner, with both bandings of the same colour and with some of the strap warps of another colour, the same defect would occur, i. e. specks or spots of that other colour would appear in the outer surface of the banding at the bindings-in of the cross-straps.

The object of this invention is to provide a method of weaving ladder webbing which eliminates the said defect, and by which it is possible to have the outer bandings of different colours (whether each is of a simple colour or not); or of the same colour and with some strap warps of another colour; without specks or spots appearing in the outer surface of a banding. In other words, the invention contemplates any ladder webbing in which the cross-straps have stripes of a different colour from a banding, which do not appear in the outer surface of that banding.

According to the invention, at the connection of a cross-strap with a banding, some of the strap warps are lifted into the banding so as to appear in the outer surface thereof, whilst the others are held to the inner surface thereof.

As applied to a webbing having woven cross-straps and having one banding of one colour and the other banding of another colour (which is its principal application as at present contemplated) the invention is characterised in that the strap warps are some of the one colour and some of the other colour, and in that, at a binding-in, those strap warps of the same colour as the banding are lifted into the banding and bound therein by the banding weft, whilst those strap warps of the other colour are caused to form a shed on the inner surface of the banding and are bound thereto by the strap weft.

The result of this arrangement is that, those warp threads of a cross-strap which are in the outer surface of a banding, being of the same colour as that banding, are not noticeable by any contrast of colour.

The cross-strap when woven will be woven with or by a weft separate from those used in the bandings, and at the bindings-in such weft will engage only those strap warps which are not lifted into the banding.

In preferred embodiments of the invention, the warp threads of the cross-straps alternate in colour; that is to say, alternate warp threads of a strap are of the colour of one banding, whilst the intermediate warp threads of the strap are of the colour of the other banding; and in the bindings-in of the cross-straps with the bandings, the alternate strap warp threads say of colour A, are shedded into the banding of colour A, whilst the intermediate strap warp threads of colour B are bound against such banding A; and on the other hand, the intermediate strap warp threads of colour B are shedded into the banding of colour B, whilst the alternate strap warp threads of colour A are bound against such banding B; all the strap-warps being themselves woven together by a strap weft, which may be the same in colour as one of the bandings.

In an example of the invention, the improved webbing is made in a tappet or dobby loom, tappets being arranged for the weaving of a herringbone or like pattern in the bandings, in known manner. There are two rows of woven cross-straps, in staggered relationship as in known manner, and the loom mechanism is arranged so that, during the connection of a strap to a banding, those strap warps of the same colour as the banding are lifted in the banding to be caught by the banding weft, the remainder being woven with the strap weft only.

The webbing, in this example, is made on a four-shuttle loom having a separate shuttle for each banding and a further separate shuttle for each row of cross-straps.

When the cross-straps are to be weftless, the shedding of the strap warps would cease between successive bindings-in, and the strap weft would "float" for the length of the unwoven strap.

In another example of the invention, the bandings are made tubular either at the bindings-in only, or for the full width of the banding; and, at any one binding-in, those strap warps of the same colour as a banding are lifted into and woven into the outer wall or ply of the tube, whereas those strap warps not of the same colour as the banding are woven into the inner wall or ply of the tube. When the full width of the banding is tubular, the banding could be in the form of a two-ply fabric with the two plies bound together.

The invention may be incorporated in webbing made according to my earlier Patent No. 2,141,-038, having long bindings-in, in which case the strap warps of a different colour from a banding would be those superimposed on the banding; as distinct from being woven into the banding by the banding weft.

The invention will now be described with the aid of the accompanying drawing, wherein—

Fig. 1 is a longitudinal section of a short length of ladder webbing with woven cross-straps, embodying the invention, the webbing being shown prior to the snipping of the warps between adjacent bindings-in, but with the bandings separated to an exaggerated extent for the sake of clearness.

Fig. 2 is a broken transverse section of the upper banding shown in Fig. 1.

Fig. 3 is a diagrammatic cross-section of one banding of a ladder web illustrating how the banding can be formed tubular in the plane of the cross straps.

Fig. 4 is a longitudinal section through the binding-in portion of a banding in which only one shuttle is used, this representing a specimen of ladder webbing according to the invention woven with two shuttles only, one for each banding.

Fig. 5 is a perspective view of the ladder webbing showing the staggered arrangement of the cross-straps.

*a* is one outer banding and *b* the other outer banding of the webbing, each composed as usual of warp and weft. *c*, *d* are the warps of one row of cross-straps and *c'*, *d'* are the warps of the other and staggered row of cross-straps. The warps *c* are of one colour, say red, and the warps *d* of another colour, say blue. Assuming the banding *a* is red, then only the red strap warps *c* will be interwoven with banding *a*, whilst the blue strap warps *d* will merely lie against the inner face of the banding *a* and be held thereto by the cooperative action of the strap warps and the weft *e* woven therewith of the cross-strap. Assuming the banding *b* is blue, then only the blue strap warps *d* will be interwoven with banding *b*, whilst the red strap warps *c* will merely lie against the inner face of the banding *b* and be held thereto by the cooperative action of the strap warps and the strap weft *e* woven therewith.

Usually each banding will be of one colour throughout, but it may be in more than one colour, i. e. warps of one colour and weft of another and the cross-strap warps bound into such banding agreeing with one only of the banding colours, and together giving a floral or ornamental pattern.

Referring to Fig. 3, the banding *a* is made of tubular form in the lines of the cross-straps and each such part has an outer wall *f* and an inner wall *g*. In some examples of the invention having this characteristic, all the strap warps may be woven into the inner wall *g* of the tube, or if desired, some only will be woven into such inner wall, the remainder being woven into the outer wall *f*. The first alternative is illustrated on the left hand side of Fig. 3, whilst the second alternative is illustrated on the right hand side of that figure. In the first alternative, the strap warps may be of any colour since in no case does any of them appear in the outer surface of the banding, whilst in the second alternative, those strap warps which are woven into the outer wall of the tube will be of the same colour as the banding, the others being of any other desired colour, for example, the colour of the other banding.

Referring to Fig. 4, the banding warps *h* are woven together by the banding weft *i*, and the strap warps are divided into two groups *j* and *k*, those in the group *j* being the same colour as the banding warps *h* and those in the group *k* being of another colour. In the shedding of the strap warps during the binding in, those in the group *j* are substantially on the outer face of the banding, being, as shown, up three picks and down one, whilst those in the group *k* are substantially on the inner face of the banding being up one pick and down three. With this arrangement as will be seen at *x*, wherever a strap warp of one colour appears in the outer face of the banding of another colour, there are two strap warps of that other colour to cover it.

When the banding is made as a two-ply fabric, or tubular for its full width, all the cross-strap warps may be woven into the inner ply or wall and therefore be of any colour, or some only will be woven into the inner wall and the others be lifted into the outer wall or ply, in which last case those lifted into the outer wall or ply will be of the same colour as such wall.

The invention is also applicable to ladder webbing made according to the invention forming the subject of my prior Patent No. 2,141,038, or according to the inventions forming the subject of my prior Patents No. 2,287,519 and No. 2,238,-465. In all cases where the warps of the cross-straps are in two colours, those of one colour will be interwoven with the banding of corresponding colour, and those of the other colour only bound to the inner face of the same banding.

What I claim is:

1. Ladder webbing comprising two outer bandings and joining cross-straps, wherein the outer bandings are of different colours, and wherein one portion of the cross-strap warps is of one colour agreeing with the colour of one banding, and the other portion is of another colour agreeing with the colour of the other banding, and wherein at a binding-in of a strap to a banding, the strap warps of like colour to the banding are interwoven with such banding, whilst the other strap warps are only bound to the inner face of the banding, no portion of the cross-strap warps of one colour showing through the banding of the other colour.

2. Ladder webbing comprising two outer bandings, and joining woven cross-straps in two rows, those straps in one row lying in staggered relationship to those in the other row; wherein the outer bandings are different in colour; wherein the cross-straps contain warps of both such colours; and wherein the strap warps of each colour are bound into the banding of corresponding colour by the banding weft, but are merely bound to the inner face of the banding of different colour by the cooperative action of the cross-strap warp and weft.

3. Ladder webbing comprising two outer bandings and a single joining row of woven cross-straps between them wherein the outer bandings are different in colour; wherein the cross-straps contain warps of both such colours; and wherein the strap warps of each colour are bound into the banding of corresponding colour by the banding weft, but are merely bound to the inner face of the banding of different colour by the cooperative action of the cross-strap warp and weft.

4. Ladder webbing comprising two outer bandings and joining cross-straps, and the bandings being respectively of different colours wherein the cross-straps are composed of warps of different colours, agreeing respectively with those of the bandings, and wherein at a binding-in those strap warps of one colour are interwoven with a banding possessing the same colour, and those strap warps of the other colour are merely laid against and bound to the inner face of the same banding.

5. Ladder webbing comprising two outer bandings and joining cross-straps between them wherein at a binding-in of a cross-strap to a banding, the strap warps are divided into two groups, those of one group having been lifted into the banding and woven therein by the banding weft, and those of the other group merely having been held against the inner face of the banding by the cooperative action of strap warp and weft.

6. Ladder webbing comprising two outer bandings and joining cross-straps between them wherein at a binding-in of a cross-strap to a banding, the strap warps are divided into two groups, those of one group having been lifted into the banding and woven therein by the banding weft, and those of the other group merely having been held against the inner face of the banding by the cooperative action of strap warp and weft, wherein the strap warps of one group are different in colour from those of the other group and wherein those of each group are the same in colour as the banding into which they are lifted.

7. Ladder webbing comprising two outer bandings and joining cross-straps between them wherein some of the cross-strap warps are of the same colour as a banding and others are of a different colour; wherein at at least one binding of a strap with a banding the banding is a two-ply woven tubular fabric, and wherein those strap warps of the same colour as the banding are woven into the outer wall of the banding whilst those of the other colour are woven into the inner wall of the banding.

8. An integrally woven ladder construction comprising two main webs having exterior faces of differing color characteristics, connected at their interior faces by cross tapes having color characteristics which include the color characteristics of both of the outer webs as a result of the cross tapes being constructed of wefts and of warps part of which possess the color characteristics of one main web and which are interwoven into only that main web, and the other part of which possess the color characteristic of the opposite main web and which are interwoven into only said opposite main web, while the warps which possess the unlike color characteristics of a main web extend over and adjacent to the inner surface of that main web, whereby each main web is free on its exterior surface from the color characteristic of the opposite main web.

9. Ladder webbing comprising two outer bandings, and joining woven cross-straps in two rows, those straps in one row lying in staggered relationship to those in the other row; wherein the outer bandings are different in colour; wherein the cross-straps contain warps of both such colours; and wherein the strap warps of each colour alternate and are bound into the banding of corresponding colour by the banding weft, but are merely bound to the inner face of the banding of different colour by the cooperative action of the cross-strap warp and weft.

10. Ladder webbing comprising two outer bandings and joining cross-straps between them wherein some of the cross-strap warps are of the same colour as a banding and others are of a different colour; wherein at at least one binding-in of a strap with a banding the banding is a two-ply fabric, and wherein those strap warps of the same colour as the banding are woven into the outer wall of the banding whilst those of the other colour are woven into the inner wall of the banding.

11. Ladder webbing comprising two outer bandings and joining cross-straps between them wherein some of the cross-strap warps are of the same colour as a banding and others are of a different colour; wherein at at least one binding-in of a strap with a banding the banding is a two-ply fabric, and wherein the cross-strap warps are woven into the inner ply only of said banding.

12. Ladder webbing comprising two outer bandings and joining cross-straps between them wherein some of the cross-strap warps are of the same colour as a banding and others are of a different colour; wherein at at least one binding-in of a strap with a banding the banding is a two-ply fabric, and wherein said banding is tubular across its whole width and those strap warps of the same colour as the banding are woven into the outer wall of the banding whilst those of the other colour are woven into the inner wall of the banding.

13. Ladder webbing comprising two outer bandings and joining cross straps between them, wherein at at least one binding-in of a strap with a banding the banding has an inner wall and an outer wall, and wherein the cross strap warps are woven into the inner wall only of said banding.

14. Ladder webbing comprising two outer bandings and joining cross straps between them, wherein at at least one binding-in of a strap with a banding the banding has an inner wall and an outer wall, and wherein some of the cross strap warps are woven into the inner wall only of said banding whereby these cross strap warps do not appear in said outer wall.

15. Ladder webbing comprising two outer bandings and joining cross straps between them, wherein the cross straps have warps of a color different from that of at least one of the outer bandings, and wherein at a binding-in of a strap to said banding, the said strap warps are only bound to the inner face of said banding with no portion of said warps showing through the said banding.

GEORGE FREDERICK FRENCH.